US009921668B1

(12) United States Patent
Chadda et al.

(10) Patent No.: US 9,921,668 B1

(45) Date of Patent: Mar. 20, 2018

(54) TOUCH PANEL CONTROLLER INTEGRATED WITH HOST PROCESSOR FOR DYNAMIC BASELINE IMAGE UPDATE

(71) Applicant: Qualcomm Technologies, Inc., San Diego, CA (US)

(72) Inventors: Trishabh Chadda, San Jose, CA (US); Guozhong Shen, San Jose, CA (US); Jon Pearson, Mukilteo, WA (US)

(73) Assignee: Qualcomm Incorporated, San Diego, CA (US)

( * ) Notice: Subject to any disclaimer, the term of this patent is extended or adjusted under 35 U.S.C. 154(b) by 591 days.

(21) Appl. No.: 13/749,829

(22) Filed: Jan. 25, 2013

(51) Int. Cl.
*G06F 3/041* (2006.01)

(52) U.S. Cl.
CPC .................................... *G06F 3/041* (2013.01)

(58) Field of Classification Search
CPC .......... G06F 3/044; G06F 3/045; G06F 3/046; G06F 3/0412; G06F 3/0416; G06F 3/0488; G06F 3/04883; G06F 3/04886
See application file for complete search history.

(56) References Cited

U.S. PATENT DOCUMENTS 5,648,642 A * 7/1997 Miller .................. G06F 1/1626 178/18.06
2005/0041018 A1* 2/2005 Philipp .................. G06F 3/045 345/178
2008/0158169 A1* 7/2008 O'Connor ............. G06F 3/0418 345/173
2008/0158174 A1* 7/2008 Land ..................... G06F 3/0418 345/173
2008/0158182 A1 7/2008 Westerman
2008/0158185 A1* 7/2008 Westerman ........... G06F 3/0488 345/173
2009/0058824 A1* 3/2009 Nissar .................. G06F 3/0421 345/173
2011/0061947 A1* 3/2011 Krah ..................... G06F 1/3215 178/18.01
2014/0125623 A1* 5/2014 Atkinson ............... G06F 3/044 345/174

* cited by examiner

*Primary Examiner* — Kent Chang
*Assistant Examiner* — Mark Edwards
(74) *Attorney, Agent, or Firm* — Weaver Austin Villeneuve & Sampson LLP-QUAL

(57) ABSTRACT

A touch panel controller is disclosed herein. The controller includes output circuitry for driving a touch panel sensor and input circuitry for determining when an object performs a touch event over the touch panel sensor. The controller is configured to cause the output circuitry to generate drive signals having a different frequency characteristic when the controller determines noise present within the sensor is above a noise threshold. The controller communicates with a software device driver on a host processor to store signal baseline images for a range of frequencies during production test and power-up. The controller is configured to receive a signal baseline image from the host processor when the controller causes change to a different drive frequency. The controller is configured to cause change to the different drive frequency while the object is still performing the touch event over the touch panel sensor.

20 Claims, 5 Drawing Sheets

300A

DURING PRODUCTION TEST OF A TOUCH PANEL SYSTEM, DRIVER CAUSES A TOUCH PANEL CONTROLLER TO DRIVE OUTPUT CIRCUITRY AT FREQUENCY $F_1$ AND CAPTURE SIGNAL BASELINE IMAGE CORRESPONDING TO FREQUENCY $F_1$
302A

TOUCH PANEL CONTROLLER SENDS A SIGNAL BASELINE IMAGE CORRESPONDING TO FREQUENCY $F_1$ TO THE DRIVER ($SBI_{FACTORY}(F1)$)
304A

THE DRIVER RECEIVES $SBI_{FACTORY}(F_1)$ FROM THE TOUCH PANEL CONTROLLER AND STORES THIS SIGNAL BASELINE IMAGE IN A NON-VOLATILE STORAGE DEVICE
306A

REPEAT BLOCKS 302A, 304A AND 306A FOR FREQUENCES $F_2, F_3 \ldots F_N$ WITHIN A PREDETERMINED RANGE OF FREQUENCIES
308A

TOUCH PANEL CONTROLLER INTEGRATED WITH HOST PROCESSOR FOR DYNAMIC BASELINE IMAGE UPDATE

BACKGROUND

A touch panel is a human machine interface (HMI) that allows an operator of an electronic device to provide input to the device using an instrument such as a finger, a stylus, and so forth. For example, the operator may use his or her finger to manipulate images on an electronic display, such as a display attached to a mobile computing device, a personal computer (PC), or a terminal connected to a network. In some cases, the operator may use two or more fingers simultaneously to provide unique commands, such as a zoom command, executed by moving two fingers away from one another; a shrink command, executed by moving two fingers toward one another; and so forth.

A touch screen is an electronic visual display that incorporates a touch panel overlying a display to detect the presence and/or location of a touch within the display area of the screen. Touch screens are common in devices such as all-in-one computers, tablet computers, satellite navigation devices, gaming devices, media devices, and smartphones. A touch screen enables an operator to interact directly with information that is displayed by the display underlying the touch panel, rather than indirectly with a pointer controlled by a mouse or touchpad. Capacitive touch panels are often used with touch screen devices. A capacitive touch panel generally includes an insulator, such as glass, coated with a transparent conductor, such as indium tin oxide (ITO). As the human body is also an electrical conductor, touching the surface of the panel results in a distortion of the panel's electrostatic field, measurable as a change in capacitance.

SUMMARY

A touch panel controller is disclosed herein. The touch panel controller is configured to operatively couple to a touch panel sensor. The touch panel sensor includes multiple drive electrodes and one or more sense electrodes. Multiple nodes are formed at the intersections of the plurality of drive electrodes and sense electrodes. The touch panel controller includes output circuitry operatively connected to the plurality of drive electrodes. The output circuitry is configured to generate drive signals having a frequency characteristic that is configurable to specific frequencies within a range of frequencies. The generated drive signals are used to drive the touch panel sensor. The frequency characteristic that is used to drive the touch panel sensor at a given time is called the initial frequency. The controller also includes input circuitry operatively connected to sense electrodes. The input circuitry is configured to measure capacitive coupling of the drive signals between the corresponding drive electrode and the corresponding sense electrode. The measured values are used by the touch panel controller to determine when an object performs a touch event over the touch panel sensor.

In an implementation of the present disclosure, the controller includes firmware/logic to determine when an object performs a touch event over the touch panel sensor. The controller is configured to cause the output circuitry to generate drive signals having a different frequency characteristic to operate a touch panel system at an optimal performance level. The touch panel controller is integrated to a host processor using a software device driver. During production test and power-up, the host processor causes touch controller to capture signal baseline values across a range of drive frequencies. The touch panel controller sends these signal baseline images to the host processor. The host processor stores these values in volatile and non-volatile memory. During operation of the touch panel system, the touch panel controller is configured to periodically sense noise level in the touch panel. If the noise level is determined to be above a threshold, the touch panel controller determines a new drive frequency that results in a low noise performance. The touch panel controller requests the host processor to furnish a signal baseline image corresponding to this new frequency. The host processor predicts a signal baseline image using pre-captured signal baseline images and sends this predicted image to the touch panel controller. The touch panel controller uses this predicted image to update its signal baseline image and changes the drive frequency to the corresponding new value for low noise operation. An object may be performing a touch event on the touch panel while this change of drive frequency and change of signal baseline image is performed.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. The use of the same reference numbers in different instances in the description and the figures may indicate similar or identical items.

DETAILED DESCRIPTION

Overview

Figure 1:
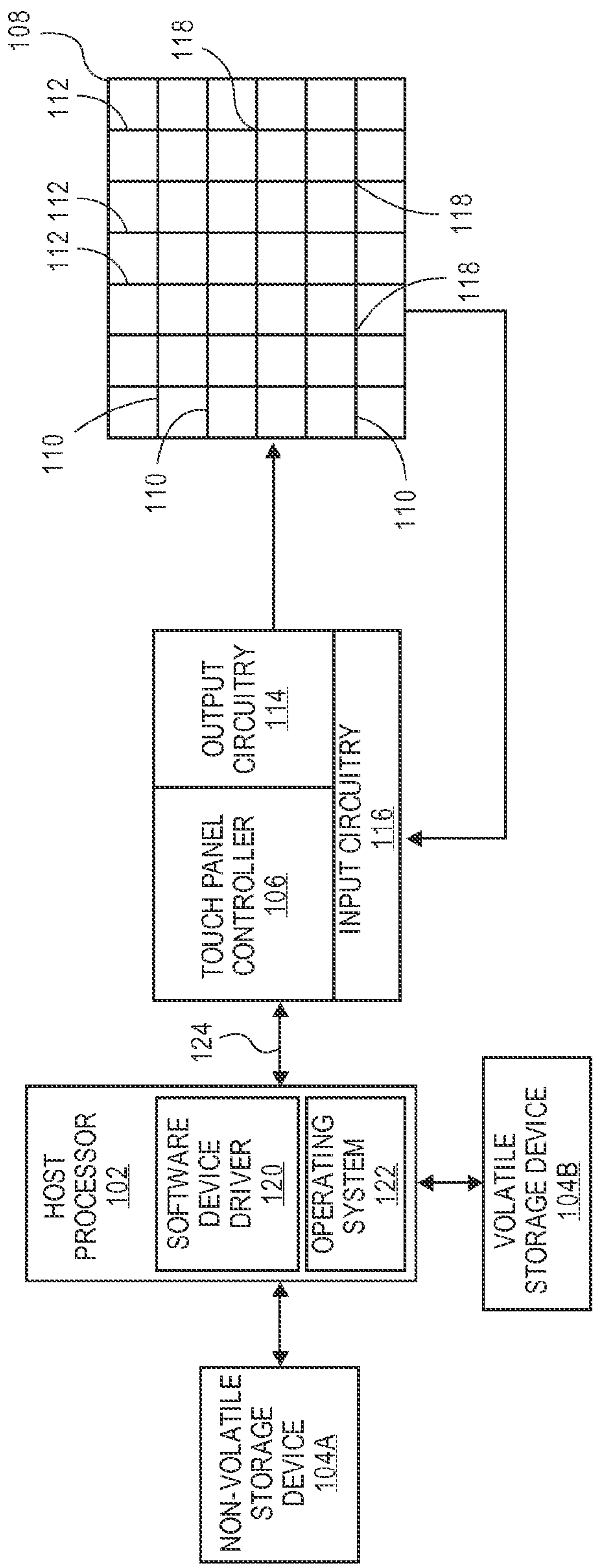
FIG. 1 is a block diagram illustrating a touch panel senor system in accordance with an example implementation of the present disclosure.

Touch panel sensors may be subjected to environmental noise due to voltage supply noise, changes in temperature, and so forth. This environmental noise may cause significant touch signal degradation. Thus, touch panel controllers may not accurately determine the position and/or the magnitude of an object in contact with the touch panel sensor.

Following is a brief description of some of the symbols and notations utilized herein:

SBI(F): Signal baseline image corresponding to a drive frequency F.

$F_{TYPICAL}$: Configured typical drive frequency within a range of frequencies.

$F_{MIN}$: Minimum drive frequency in the range of frequencies.

$F_{MAX}$: Maximum drive frequency in the range of frequencies.

$F_{INITIAL}$: Drive frequency of operation at a given time.

$F_{OPTIMAL}$: Drive frequency determined to have a noise-level lower than noise-level corresponding to frequency $F_{INITIAL}$.

$SBI_{FACTORY}(F)$: Signal baseline image at drive frequency F captured during in-factory production test of a touch panel system.

$SBI_{POWERUP}(F)$: Signal baseline image at drive frequency F captured during power-up of a touch panel system.

$SBI_{COMPOSITE}(F)$: Signal baseline image at drive frequency F calculated using values of $SBI_{FACTORY}(F)$ and $SBI_{POWERUP}(F)$.

The touch panel controller is configured to operatively couple to a touch panel sensor. The touch panel sensor includes multiple drive electrodes and sense electrodes. Thus, the touch panel sensor comprises multiple nodes that are formed at the intersections of the plurality of drive electrodes and sense electrodes. The touch panel controller includes output circuitry operatively connected to the drive electrodes. The output circuitry is configured to generate drive signals having a frequency characteristic that is configurable to specific frequencies within a range of frequencies. The generated drive signals are used to drive the touch panel sensor. In an implementation, the output circuitry comprises a digital-to-analog converter communicatively connected to a buffer. The frequency characteristic that is used to drive the touch panel sensor at a given time is called the initial frequency, $F_{INITIAL}$. The controller also includes input circuitry operatively connected to the sense electrodes. The input circuitry is configured to measure capacitive coupling of the drive signals between the corresponding drive electrode and the corresponding sense electrode. In an implementation, the input circuitry may comprise one or more charge amplifiers. The values measured using input circuitry are used by the touch panel controller to determine when an object performs a touch event over the touch panel sensor. The touch panel controller performs estimation of the characteristics of touch events, such as the touch event position, amplitude, or the like, on the touch panel sensor.

A signal baseline image (SBI) comprises the capacitance values measured by the input circuitry at the intersection of drive channels and sense channels when no touch object is in contact with or in proximity of the touch panel sensor. The signal baseline image provides a reference value against which subsequent measured capacitance values are compared to determine if an object is in contact with or in proximity to the touch sensor panel. The difference between signal baseline image values and the subsequent measured capacitance values is used to calculate the characteristics of touch object(s), such as position, amplitude, and so forth. Signal baseline image can vary significantly as the frequency characteristic of the drive signals in the drive circuitry is changed. A processor, such as the host processor, contains a driver (e.g., a software device driver) that is configured to cause the touch panel controller to capture signal baseline images corresponding to multiple drive frequencies within a range of frequencies. This signal baseline image capture is performed both during in-factory touch panel controller configuration and during each power up of the touch panel controller. The software device driver in the processor (e.g., the host processor) is configured to obtain the signal baseline images corresponding to multiple drive frequencies within a range of frequencies from the touch panel controller and store the signal baseline images in a storage device (e.g., memory) of the processor.

The touch panel controller is configured to measure noise present in the touch panel sensor during operation. If the noise is found to be above a noise threshold, the touch panel controller is configured to determine a frequency characteristic within the range of frequencies that has a lower noise characteristic. This frequency characteristic associated with lower noise characteristic is referred to as the optimal frequency, $F_{OPTIMAL}$. The touch panel controller communicates the value of $F_{INITIAL}$, the value of $F_{OPTIMAL}$, and the signal baseline image corresponding to $F_{INITIAL}$ to the host processor. The software device driver in the host processor uses these values and the signal baseline images stored in the host processor's storage device described herein to calculate a signal baseline image corresponding to $F_{OPTIMAL}$. The software device driver communicates this signal baseline image corresponding to $F_{OPTIMAL}$ to the touch panel controller. The touch panel controller is configured to cause the output circuitry to generate drive signals having a frequency characteristic corresponding to $F_{OPTIMAL}$. The touch panel controller is also configured to update the signal baseline image in the touch controller to the signal baseline image received from the host processor corresponding to $F_{OPTIMAL}$.

Accordingly, a touch panel controller configured to cause a transition between a drive signal having a frequency characteristic corresponding to $F_{INITIAL}$ (e.g., a higher noise environment) to a drive signal having a frequency characteristic corresponding to $F_{OPTIMAL}$ (e.g., a lower noise environment) while an object is in contact with, or in proximity of, a touch sensor panel is disclosed herein. Thus, the touch panel sensor may adapt to a low-noise operation while the object is still positioned in contact with or in proximity of the touch panel sensor by determining $F_{OPTIMAL}$ corresponding a lower noise operation and communicating with the host processor to obtain a signal baseline image corresponding to $F_{OPTIMAL}$. The touch panel controller uses $F_{OPTIMAL}$ to drive the touch panel sensor at optimal frequency, and uses the signal baseline image corresponding to $F_{OPTIMAL}$ to update the signal baseline image in the touch panel controller.

Example Implementations

FIG. 1 illustrates a touch panel sensor system 100 in accordance with an example implementation of the present disclosure. It is contemplated that various computing devices may employ the touch panel sensor system 100 to detect touch events performed over a touch panel of the computing device. The computing device may be, for example, a mobile computing device, such as smartphone devices, tablet devices, and/or eReaders. However, it is understood that the system 100 may be employed by other computing devices (e.g., information kiosks, automated teller machines, point of sale machines, etc.) as well. The touch panel sensor system 100 includes a processor 102 (e.g., a host processor) configured to execute instructions and to execute operations associated with the touch panel sensor system 100. The system 100 also includes storage devices 104A, 104B that are configured to store computer code and data (e.g., operating system code, software device driver code, user data etc.) required by the host processor 102. The storage devices 104A is a non-volatile storage and may comprise of non-volatile storage devices such as flash memory, or the like and the storage device 104B is a volatile storage device and may comprise volatile storage devices such as dynamic access memory (DRAM) or the like.

In one or more implementations, the processor 102 (e.g., the host processor) comprises a host applications processor. For example, the host processor 102 may be configured as an integrated circuit chip (i.e., a system on a chip (SoC)) designed to support applications running within a mobile operating system environment. Thus, the host processor 102 may be configured to provide a self-contained operating environment that furnishes operational capabilities to support a mobile computing device's application. For example, the host processor 102 may be configured to support (e.g., furnish processing functionality for) memory management, graphics processing, clock (timing) signal generation, and multimedia coding/decoding. In some implementations the mobile computing device employs at least one additional processor. In these implementations the host processor 102 (e.g., the applications processor) is independent from the additional processors. For instance, the host processor 102 may be configured to perform the mobile application processing of the mobile computing device and the additional processor is configured to perform other dedicated processing (e.g., wireless communication processing, etc.).

As shown, the host processor 102 is operatively connected (via a communication interface 124, such as a communications data bus, or the like) to a touch panel controller 106, and the touch panel controller 106 is operatively connected (via a communication interface, such as a data bus, or the like) to a touch panel sensor 108. In one or more implementations, the touch panel sensor 108 is utilized to sense (e.g., detect) a touch event over a surface of a touch panel. For example, the touch panel sensor 108 can include a capacitive sensing medium having a plurality of row traces (e.g., electrodes), or driving lines 110, and a plurality of column traces (e.g., electrodes), or sensing lines 112, for detecting a change in capacitance due to a touch event performed over a surface of the touch panel. Thus, the touch panel sensor is configured to recognize touches and the position and the magnitude of the touches performed over a surface. In a specific implementation the touch panel sensor 108 is a transparent panel positioned in front of a display device, such as a liquid crystal display, cathode ray tube, plasma displays, or the like. The row and the column traces can be formed from a transparent conductive material, such as Indium Tin Oxide (ITO) or Antimony Tin Oxide (ATO), although other transparent and non-transparent materials such as copper may be used. In some implementations, the row and the column traces can be perpendicular to each other such that the row and column traces define a coordinate system and each coordinate location comprises a capacitor formed at the intersection of the row and column traces, as described in greater detail herein. In other implementations, other non-Cartesian orientations are also possible.

Figure 2:
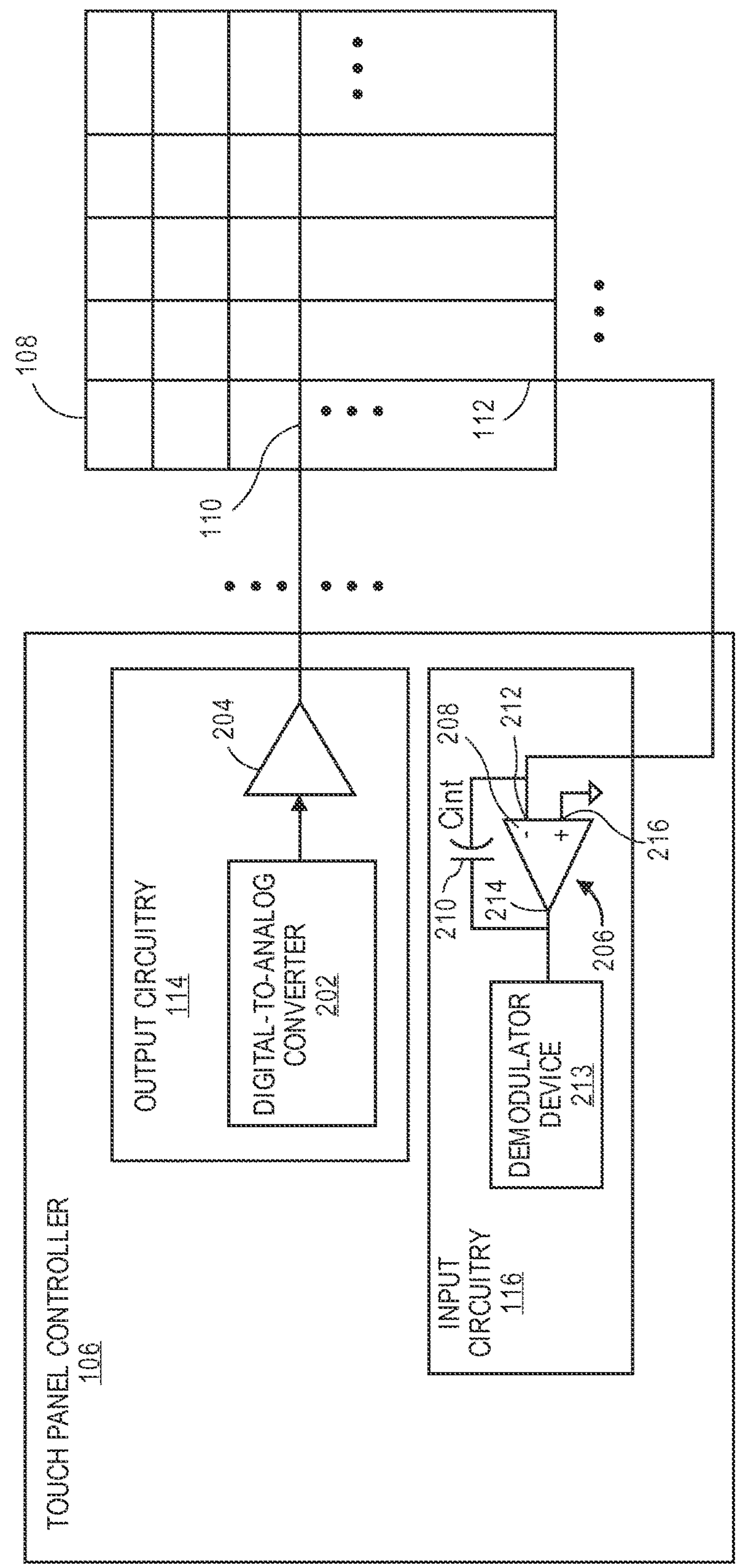
FIG. 2 is a circuit diagram illustrating a touch panel controller in accordance with a specific implementation of the present disclosure.

The touch panel controller 106 is configured to interface with the touch panel sensor 108 to stimulate the sensor 108 (e.g., stimulate the driving lines) and to detect (e.g., read) the change in capacitance from the sensing lines. In one or more implementations, the touch panel controller 106 comprises firmware and/or application specific integrated circuit (ASIC) that is configured to drive the driving lines 110 (e.g., drive channels). For example, the touch panel controller 106 may include circuitry 114 (e.g., output circuitry) configured to output drive signals (e.g., a sensor driver) having waveform characteristics that drive the driving lines. In a specific implementation, as shown in FIG. 2, the sensor driver may be a digital to analog converter 202 (DAC), which is electrically connected to a buffer 204. The buffer 204 is electrically connected to a respective driving line 110. However, in some implementation, the sensor driver may comprise other suitable devices capable of producing driving signals. The controller 106 also includes sensing circuitry (e.g., sensing channels) 116 (e.g., input circuitry) for measuring (e.g., detecting) a change in capacitance due to a touch event performed over the touch panel sensor 108.

Each intersection 118 of the driving lines 110 (e.g., rows) and the sensing lines 112 (e.g., columns) represents a pixel that has a characteristic mutual capacitance. A grounded object (e.g., a finger) that moves towards a corresponding pixel 118 may shunt an electric field present between the corresponding row and column intersection, which causes a decrease in the mutual capacitance at that location. During operation, each row (or column) may be sequentially charged by driving (via the sensor drivers) the corresponding drive line 110 with a predetermined voltage signal having a waveform corresponding to a particular frequency characteristic. The capacitance of each intersection 118 is measured. That is, the sensing circuitry 116 is configured to measure capacitive coupling of the drive signals between the drive lines 110 and the sensing lines 112 to determine the capacitance of an object with respect to each node (e.g., an intersection 118 pixel). This forms a two-dimensional (2D) image of pixels that has rows equal to number of drive channels and columns equal to number of sense channels. Although, in another implementation, a subset of drive channels and subset of sense channels may be used to obtain a 2D image of smaller dimensions. The touch panel controller 106 is configured to use this 2D signal image to determine the position(s) of an object (or objects) when the object touches the touch sensor 108. The logic used to determine characteristics like position, amplitude (and the like) of objects touching the touch panel 108 is contained in the touch panel controller 106. This may implemented in the touch panel controller using firmware code, ASIC and/or field programmable gate arrays (FPGAs).

A signal baseline image (SBI) is defined as 2D image of pixels formed by plurality of pixels 118 at the intersection of drive channels 110 and sense channels 112 on the touch panel 108, when no object is in contact with or in proximity of the touch panel. The touch panel controller 106 stores the currently in-use SBI in its memory. In one implementation, the signal baseline image is captured by the touch panel controller 106 at power-up of the controller 106 (e.g., when the touch panel sub-system is booted up). This signal baseline image may be continually updated by controller 106 by using sensed 2D image values when no touch (e.g., a steady-state condition) is present on the touch panel 108. This continual update may be necessary because the signal baseline images may be a function of environment variables, such as temperature and supply voltage. The signal baseline image is used as reference/datum to detect changes in capacitance of the subsequently captured 2D image of pixels 118 within the touch panel sensor 108. From subsequent 2D images of pixels captured by the sense circuitry 116, the touch panel controller 106 subtracts the signal baseline image to get a "difference 2D image". This "difference 2D image" is used by the touch panel controller 106 to determine characteristics of touch object(s)(e.g., position, amplitude, or the like). The signal baseline image may vary significantly as a function of frequency. In this document, signal baseline image corresponding to a specific frequency F may be referred to as SBI(F).

The controller 106 is configured to generate the drive signals (e.g., via the circuitry 114) necessary to scan the touch panel sensor 108. The touch panel controller 106 is initially configured with a predetermined range of frequencies and a typical drive frequency within that range called $F_{TYPICAL}$ (e.g., a preset frequency at which the touch panel controller 106 is configured to scan the touch panel sensor 108). In one implementation, the range of frequencies may be a continuous range ranging from a minimum value of $F_{MIN}$ to a maximum value of $F_{MAX}$. In other implementations, the range of frequencies may be non-continuous, for example, from $F_{MIN1}$ to $F_{MAX1}$, then from $F_{MIN2}$ to $F_{MAX2}$, and so on. In this case, the range from $F_{MAX1}$ to $F_{MIN2}$ is not covered in the operating range of frequencies. The controller 106 is configured to cause the output circuitry 114 to generate drive signals at differing frequencies. For example, the controller 106 is configured to cause the circuitry 114 to generate drive signals occurring at a first frequency within the range of frequencies, $F_{MIN}$ to $F_{MAX}$. In another example, the controller 106 is configured to cause the circuitry 114 to generate drive signals occurring at a second frequency. In yet another example, the controller 106 is configured to generate drive signals occurring at a third frequency. It is understood that the controller 106 can be configured to generate a drive signal occurring at a fourth frequency, a fifth frequency, a sixth frequency, and so forth. Thus, the touch panel sensor 108 can be driven at various frequencies (e.g., the sensor 108 is driven by a drive signal having a first frequency characteristic for a first time period; the sensor 108 is driven by a drive having a second frequency characteristic for a second time period; the sensor 108 is drive by a drive signal having a third frequency characteristic for a third time period etc.).

The sensing circuitry 116 is configured to monitor (e.g., determine) the charge transferred in a given time to detect changes in capacitance at each node. The positions within the touch panel sensor 108 where the capacitance changes occur and the magnitude of those changes are used to identify and to quantify the touch events performed over the sensor 108. Thus, driving the drive lines 110 and sensing the charge transfer as a result of the touch event is a function of the controller 106. In some implementations, the sensing circuitry 116 may comprise a plurality of integrator devices 206. As shown each integrator device 206 is coupled to a corresponding sensing line. As shown, the integrator devices 206 comprise a charge amplifier 208 having an integrating capacitor ($C_{int}$) 210 electrically connected between an inverting terminal 212 and an output terminal 214 of the charge amplifier 208. The charge amplifier 208 also includes a non-inverting terminal 216. The charge amplifier 208 is configured to transfer the input charge (e.g. charge from the sensing lines 112) to the integrating capacitor 210 and to generate an output voltage at the output 214 at least approximately equal to the voltage across the capacitor 210. Thus, the output voltage is proportional to the charge at the integrating capacitor 210 and, respectively, to the input charge. However, in another implementation, the sensing circuitry 116 may comprise any device (e.g., circuitry) capable of receiving a capacitance and outputting a voltage that corresponds to the capacitance. The output 214 of the charge amplifier 208 is electrically connected to a demodulator device 213. In one or more implementations, the demodulator device 213 comprises an analog-to-digital converter (ADC). The output of the demodulator device 213 for the plurality of pixels 118 forms a 2D image of pixels that is used by controller 106. The controller 106 first subtracts the signal baseline image (that is the reference image corresponding to the presence of no touch objects) from the captured 2D image to form a "difference 2D image". Then the controller 106 uses this "difference 2D image" to perform an estimation of the number of touch objects present on the touch panel 108, as well as the corresponding touch object characteristics (e.g., position, amplitude etc.). The determined number of touch objects and respective characteristics are then communicated to the host processor 102 that may be controlled by the touch panel sensor system 100. For simplicity purposes, only a single sensor driver (DAC 202 and buffer 204) and a single integrator device 206 is shown. However, it is understood that the output circuitry 114 may include multiple sensor drivers that electrically connect to a corresponding driving line 110, and the input circuitry 116 may include multiple integrator devices 206 that electrically connect to a corresponding sensing line 112.

As described above, FIG. 2 illustrates a specific implementation of the touch panel sensor system 100 shown in FIG. 1. In FIG. 2, the circuitry 114 (e.g., sensor driver) comprises a sensor DAC 202 coupled to a buffer 204. The buffer 204 is configured to buffer the signal generated by the sensor DAC 202 and outputs the buffered drive signal to the sensor 108 (e.g., drive the driving lines 110 of the sensor 108). In implementations, the sensor DAC 202 may generate a signal having waveform characteristics represented by the equation:

$$A_1 \cdot \sin(\omega t), \qquad \text{EQN. 1},$$

where $A_1$ represents the amplitude of the signal, $\omega$ represents the angular frequency of the signal, and t represents time. However in other implementations, the sensor DAC 222 may be configured to output other signals having other waveform characteristics, such as signals having square waveform characteristics, and so forth.

In an implementation, the host processor 102 contains an operating system 122 that is configured to manage one or more programs within the system 100. The operations performed by operating system 122 may be for example memory management, graphics processing, multimedia coding/decoding, receiving input reports from input devices (e.g., the touch panel controller 106, keyboard, mouse, etc.). As shown in FIG. 1, host processor 102 includes a driver 120 (e.g., a software device driver) that is configured to furnish translation functionality between the controller 106 and the operating system associated with the host processor 102. In an implementation, the software device driver 120 may comprise a software module contained as part of the operating system 122. In another implementation, the software device driver may comprise a software module that works as a user-space program running on top of the operating system 122. It is to be understood that there are many methods of implementing the software device driver. The software device driver is determined to be a software module residing in the host processor 102 that works to send configuration commands to the controller 106 and receive touch object reports from the controller 106 over the communication bus 124. The configuration commands that the software device driver 120 sends to the touch controller 106 over the communication interface 124 may comprise of configuration values, such as a range of drive frequencies, typical drive frequency $F_{TYPICAL}$, noise threshold values, signal baseline image, and the like, that are used for the operation of the touch controller 106. The commands sent by software device driver 120 to controller 106 may also be functionalities required by operating system 122 related to going into a low power mode of operation or running in active mode of operation, and so forth. It is to be understood that software device driver 120 has ability to send commands to controller 106 to cause controller 106 to operate as required for operation of the touch system 100 and as required by the host processor (like in low power mode, at a given drive frequency, to determine maximum number of touch objects controller 106 can detect and the like). The software device driver 120 also receives touch reports from touch controller 106. The touch controller 106 is configured to detect touch objects on the touch panel 108 and send touch reports to host processor 102 over the communication bus 124. The touch reports typically include a number of touch objects detected by controller 106 and respective characteristics (e.g., position, amplitude, and the like) on the touch panel 108. The controller 106 is also configured to send other type of reports to host processor 102. These may comprise of specific functionalities requested by the controller 106 from the host processor 102. In an implementation, the host processor 106 may send a report to the host processor 102 to request host processor 102 to send to the controller 106 a signal baseline image corresponding to a new drive frequency for low-noise operation. The touch panel controller 106 may also send a report to the host processor 102 to request it to perform specific signal processing operations on reported touch coordinates like smoothing, tracking, and so forth. In both cases, commands sent (transmitted) from the host processor 102 to the controller 106 and reports received from the controller 106 by the host processor 102, the software device driver 120 is the software module performing the specific operation on the host processor 102.

During manufacturing of touch sensor system 100, a one-time touch panel configuration may be performed during factory testing (e.g., production testing performed in factory). This panel configuration is used to configure the software device driver 120 and the controller 106 with calibration parameters, such as a range of frequencies ($F_{MIN}$ to $F_{MAX}$), typical drive frequency $F_{TYPICAL}$, noise thresholds, gain values used to amplify outputs of input circuitry 116 before using the controller 106 to determine touch objects, thresholds to determine characteristics of touch objects sensed on touch panel 108, and the like. The software device driver 120 is configured to cause the touch panel controller 106 operate the drive circuitry 114 at multiple drive frequencies $F_1$, $F_2$, $F_3$ . . . $F_N$ that lie within a range of frequencies, $F_{MIN}$ to $F_{MAX}$. At each of these drive frequencies, the 2D image formed by plurality of pixels 118 on the panel 108 is captured by the controller 106. The captured 2D images correspond to signal baseline images at each of the drive frequencies $F_1$, $F_2$, $F_3$ . . . $F_N$, as no touch present on touch panel 108. A signal baseline image captured during in-factory calibration corresponding to a specific drive frequency F is referred to as $SBI_{FACTORY}(F)$. The controller 106 is configured to report the signal baseline images at each of the drive frequencies $F_1$, $F_2$, $F_3$ . . . $F_N$ namely $SBI_{FACTORY}(F_1)$, $SBI_{FACTORY}(F_2)$, $SBI_{FACTORY}(F_3)$ . . . $SBI_{FACTORY}(F_N)$ to the software device driver 120. The software device driver 120 receives signal baseline images $SBI_{FACTORY}(F_1)$, $SBI_{FACTORY}(F_2)$, $SBI_{FACTORY}(F_3)$ . . . $SBI_{FACTORY}(F_N)$ and stores these signal baseline images in the non-volatile memory 104A. These signal baseline images are used during operation of system 100 to provide to the controller 106 a signal baseline image corresponding to a low noise frequency of operation. Typically, the signal baseline images vary significantly as a function of drive frequency. Along with capturing $SBI_{FACTORY}(F_1)$, $SBI_{FACTORY}(F_2)$ . . . $SBI_{FACTORY}(F_N)$ during panel calibration in factory, a similar capture of signal baseline images is also performed each time the controller 106 powers-up (or boots-up). Thus, each time the controller 106 powers-up, the software device driver 120 causes the controller 106 to capture signal baseline values corresponding to multiple drive frequencies $F_1$, $F_2$, $F_3$ . . . $F_N$. These values are referred to as $SBI_{POWERUP}(F_1)$, $SBI_{POWERUP}(F_2)$, $SBI_{POWERUP}(F_3)$ . . . $SBI_{POWERUP}(F_N)$. These signal baseline images for the current power-up of controller 106, namely $SBI_{POWERUP}(F_1)$, $SBI_{POWERUP}(F_2)$, $SBI_{POWERUP}(F_3)$ . . . $SBI_{POWERUP}(F_N)$, are received by the software device driver 120 from the controller 106 and stored in host processor's volatile memory 104B.

The touch panel controller 106 is configured to start operating at a typical frequency of operation ($F_{TYPICAL}$). The touch panel controller 106 captures signal baseline value corresponding to $F_{TYPICAL}$ at power-up ($SBI_{POWERUP}(F_{TYPICAL})$). The controller 106 then uses this value to calculate a "difference 2D image" formed by subtracting signal baseline image corresponding to $F_{TYPICAL}$ from the 2D image formed from the output of input circuitry 116 during operation. The controller 106 uses this "difference 2D image" to determine a number of touch objects and corresponding characteristics. The controller 106 is configured to continually adapt signal baseline image to account for changes in environment parameters, such as temperature. This continuous modification of the signal baseline image is understood to be done when the controller 106 determines that no object is in contact with, or in proximity to, the touch panel 108. Thus, the original value of captured signal baseline image $SBI_{POWERUP}(F_{TYPICAL})$ is continually updated to account for environmental parameters (e.g., temperature, or the like). In one implementation this continual update may be done using an infinite impulse response (IIR) linear filter. In another implementation, another update function may be used for example, a median of stored signal baseline image and newly obtained 2D images. As a result of this continuous update the signal baseline image corresponding to frequency of operation F changes from the value obtained at power-up, $SBI_{POWERUP}(F)$. This adjusted value of signal baseline image at an operating drive frequency F is referred to as $SBI_{ADJUSTED}(F)$.

The touch controller 106 is configured to continually sense the noise level in the signals in the touch panel 108. In an implementation, this noise level may be determined by measuring standard deviation in the output of the touch panel 108. In other implementations, other method to determine noise in panel 108 may be used. Thus, the controller 106 continually monitors noise level in the touch panel 108. At a given time of operation, the controller 106 is operating the panel 108 via circuitry 114 at a frequency $F_{INITIAL}$. As discussed herein, the controller 106 also contains signal baseline image corresponding to frequency $F_{INITIAL}$ in memory of controller 106 for touch object calculation. This signal baseline image is called $SBI_{ADJUSTED}(F_{INITIAL})$. If the detected noise level is found to exceed a predetermined noise threshold, the controller 106 is configured to perform a noise spectrum calculation of drive frequencies (i.e. measure noise level at all drive frequencies) within the range of frequencies, $F_{MIN}$ to $F_{MAX}$. This noise spectrum is used to find a new frequency of operation ($F_{OPTIMAL}$) that corresponds to a lower noise-level during operation. Once this low-noise drive frequency, $F_{OPTIMAL}$, is determined, the controller 106 proceeds to obtain the signal baseline image corresponding to the new drive frequency, $F_{OPTIMAL}$. The signal baseline image typically varies significantly as a function of drive frequency, which may require a new signal baseline image to be obtained at the new drive frequency, $F_{OPTIMAL}$. A reliable signal baseline image cannot be captured from the touch panel 108 at this time because there may be touch objects in contact with, or in proximity to, the touch panel 108. The signal baseline image is required to be free from touch objects so that it may be used as a reference/datum to detect change in capacitance values caused by touch objects in subsequently captured 2D images (captured from the panel 108 via the circuitry 116). As a result, a reliable signal baseline image may not be captured from the touch panel 108 at the instant of detecting noise. Subsequently, the controller 106 sends (reports) a request for a new signal baseline image to the software device driver 120 residing in the host processor 102. Along with this request for new signal baseline image, the controller 106 sends the value of $F_{OPTIMAL}$, the value of $F_{INITIAL}$, and the signal baseline image contained in its storage device (e.g., memory) corresponding to $F_{INITIAL}$ (namely $SBI_{ADJUSTED}(F_{INITIAL})$, to the software device driver 120. It is to be understood that the signal baseline image sent at this instant by controller 106 was being continually adapted by controller 106 to account for changes in environment temperature (as discussed above).

The software device driver 120 receives a request for the new signal baseline image from the controller 106 as described above. Along with this request, the driver 120 also receives the value of $F_{OPTIMAL}$, the value of $F_{INITIAL}$, and the $SBI_{ADJUSTED}(F_{INITIAL})$ from the controller 106. Upon receiving this request, the software device driver 120 is configured to estimate a new signal baseline image corresponding to the new drive frequency $F_{OPTIMAL}$. The software device driver 120 may use at least one of the following values for estimation of new signal baseline image:

- Value of $F_{OPTIMAL}$.
- Value of $F_{INITIAL}$.
- Signal baseline image corresponding to frequency $F_{INITIAL}$ received from controller 106, namely $SBI_{ADJUSTED}(F_{INITIAL})$(described above).
- Signal baseline images stored in non-volatile memory 104A of host processor 102 corresponding to drive frequencies $F_1, F_2, F_3 \ldots F_N$ that were captured at the time of in-factory panel calibration, namely $SBI_{FACTORY}(F_1)$, $SBI_{FACTORY}(F_2)$, $SBI_{FACTORY}(F_3) \ldots SBI_{FACTORY}(F_N)$(described above).
- Signal baseline images stored in volatile memory 104B of host processor 102 corresponding to drive frequencies $F_1, F_2, F_3 \ldots F_N$ that were captured at the time of power-up of controller 106, namely $SBI_{POWERUP}(F_1)$, $SBI_{POWERUP}(F_2)$, $SBI_{POWERUP}(F_3) \ldots SBI_{POWERUP}(F_N)$ (described above).

It is contemplated that $SBI_{FACTORY}$ and $SBI_{POWERUP}$ are used for this estimation is to account for changes in characteristics of panel 108 over time. The $SBI_{FACTORY}$ values may be reliable signal baseline images because it was captured in-factory under controlled conditions, free from the presence of touch objects in contact with, or in proximity to, the touch panel 108. The $SBI_{POWERUP}$ values correspond to the values of signal baseline values obtained at each power-up. These values are characteristic of changes in panel characteristics over time. For instance, there might be panel deformations causing a change in gain of its signals that cause a change in signal baseline image profile with time. The software device driver 120 uses both $SBI_{FACTORY}$ and $SBI_{POWERUP}$ to create a profile of signal baseline images as a function of frequency. Thus, for each value of frequency F belonging to the list $F_1, F_2, F_3 \ldots F_N$, a value of the signal baseline image is determined that uses information from both $SBI_{FACTORY}$ and $SBI_{POWERUP}$. This signal baseline image at a specific frequency F that includes information from both $SBI_{FACTORY}(F)$ and $SBI_{POWERUP}(F)$ is referred to as $SBI_{COMPOSITE}(F)$.

Upon determining the list of values $SBI_{COMPOSITE}(F_1)$, $SBI_{COMPOSITE}(F_2)$, $SBI_{COMPOSITE}(F_3) \ldots SBI_{COMPOSITE}(F_N)$, the software device driver 120 characterizes the $SBI_{COMPOSITE}$ versus frequency profile utilizing a curve fitting function. Some examples of curve fitting functions are linear-fit, polynomial-fit or other curve-fitting methods. It is to be understood that a suitable curve fitting functions may be used to characterize the profile of $SBI_{COMPOSITE}$ versus the drive frequency. In one implementation of a linear-fitting function, a best-fit line is found on the set of points (F, $SBI_{COMPOSITE}$ (F)) for all the points ($F_1$, $SBI_{COMPOSITE}(F_1)$) ($F_2$, $SBI_{COMPOSITE}(F_2)$), ($F_3$, $SBI_{COMPOSITE}(F_3)$) . . . ($F_N$, $SBI_{COMPOSITE}(F_N)$). This best-fit line may be of the form of EQN. 2 (see below) for a given frequency F and the estimated signal baseline image, SBI (F). In EQN. 2, the slope of the line m and offset c are both 2D matrices corresponding to each element in 2D image SBI(F). F on the other hand is a singular value corresponding to drive frequency.

$$SBI(F)=F.m+c \qquad \text{EQN. 2}$$

In other implementations, other best-fit functions corresponding to polynomial-fit and the like may be used.

Once the best-fit parameters are determined, these parameters may be used to create an estimation function called ESTFXN. This estimation function takes as inputs frequency $F_B$, frequency $F_A$, and signal baseline image corresponding to $F_A$ ($SBI(F_A)$), and gives as an output an estimate of signal baseline image corresponding to $F_B$ ($SBI_{ESTIMATE}(F_B)$). This estimation function is described in EQN. 3:

$$SBI_{ESTIMATE}(F_B)=\mathrm{ESTFXN}\ (F_B, F_A, SBI(F_A)) \qquad \text{EQN. 3}$$

For the specific implementation of a linear-fit function described by EQN. 2 the estimation function ESTFXN may be given by EQN. 4:

$$SBI_{ESTIMATE}(F_B) = (F_B \cdot m + c) \cdot \frac{SBI(F_A)}{(F_A \cdot m + c)} \qquad \text{EQN. 4}$$

The function described in EQN. 4 determines a scale factor $$\frac{SBI(F_A)}{(F_A \cdot m + c)}$$

and uses it to scale up the value determined using best-fit function described in EQN. 2. Because $SBI(F_A)$, m and c are 2D matrices, the division and multiplication operations in EQN. 4 are defined to be an element-by-element division and multiplication, respectively. That is, the calculation is performed for each element of the output 2D image $SBI_{ESTIMATE}(F_B)$ using the corresponding elements of 2D images $SBI(F_A)$, m and c. This describes a specific implementation of an estimation function based on a linear-fit function. It is to be understood that many other curve fitting functions and corresponding estimation functions are possible, and one may be chosen that best models the profile of the signal baseline image for a given touch sensor system 100.

Once the software device driver 120 determines the estimation function described by EQN. 3 for a general case (and by EQN. 4 for a specific implementation using a linear-fit function), the driver 120 uses the inputs provided to it by the controller 106 to determine an estimate of the signal baseline image at the new drive frequency $F_{OPTIMAL}$. The software device driver 120 received inputs $F_{OPTIMAL}$, $F_{INITIAL}$ and $SBI_{ADJUSTED}(F_{INITIAL})$ from the controller 106, along with the request to provide a new SBI value corresponding to $F_{OPTIMAL}$. The software device driver 120 then uses these inputs to determine an estimate of SBI at new frequency $F_{OPTIMAL}$ using EQN. 3. This calculation is described in EQN. 5:

$$SBI_{ESTIMATE}(F_{OPTIMAL})=\text{ESTFXN}\ (F_{OPTIMAL}, F_{INITIAL}, SBI_{ADJUSTED}(F_{INITIAL})) \quad \text{EQN. 5}$$

After determining this new estimate $SBI_{ESTIMATE}(F_{OPTIMAL})$, the software device driver 120 sends (transmits) a command to the controller 106 to change its value of signal baseline image using this new value.

Upon receiving the command with the new signal baseline image corresponding to $F_{OPTIMAL}$ (namely $SBI_{ESTIMATE}(F_{OPTIMAL})$) from the software device driver 120, the touch controller 106 proceeds to switch the drive frequency of operation applied to touch panel 108 to low-noise frequency of operation, $F_{OPTIMAL}$. The touch panel controller 106 causes the output circuitry 114 to operate at new frequency $F_{OPTIMAL}$. The touch panel controller 106 uses the received signal baseline image from the software device driver 120, namely $SBI_{ESTIMATE}(F_{OPTIMAL})$, to update the value of the signal baseline image residing in the storage device (e.g., memory) of the controller 106. The controller 106 uses this new signal baseline image for subsequent estimation of touch objects on panel 108. This update of scan frequency to new value ($F_{OPTIMAL}$) and the update of the signal baseline image to the new signal baseline image value ($SBI_{ESTIMATE}(F_{OPTIMAL})$) may be performed while a touch object is still positioned in contact with, or in proximity to, the touch panel 108. This change to low-noise operation happens to provide ability to detect touch objects continuously by changing operating state to low-noise operation without the need to lift touch objects from the touch panel 108.

Example Methods

Figure 3A:
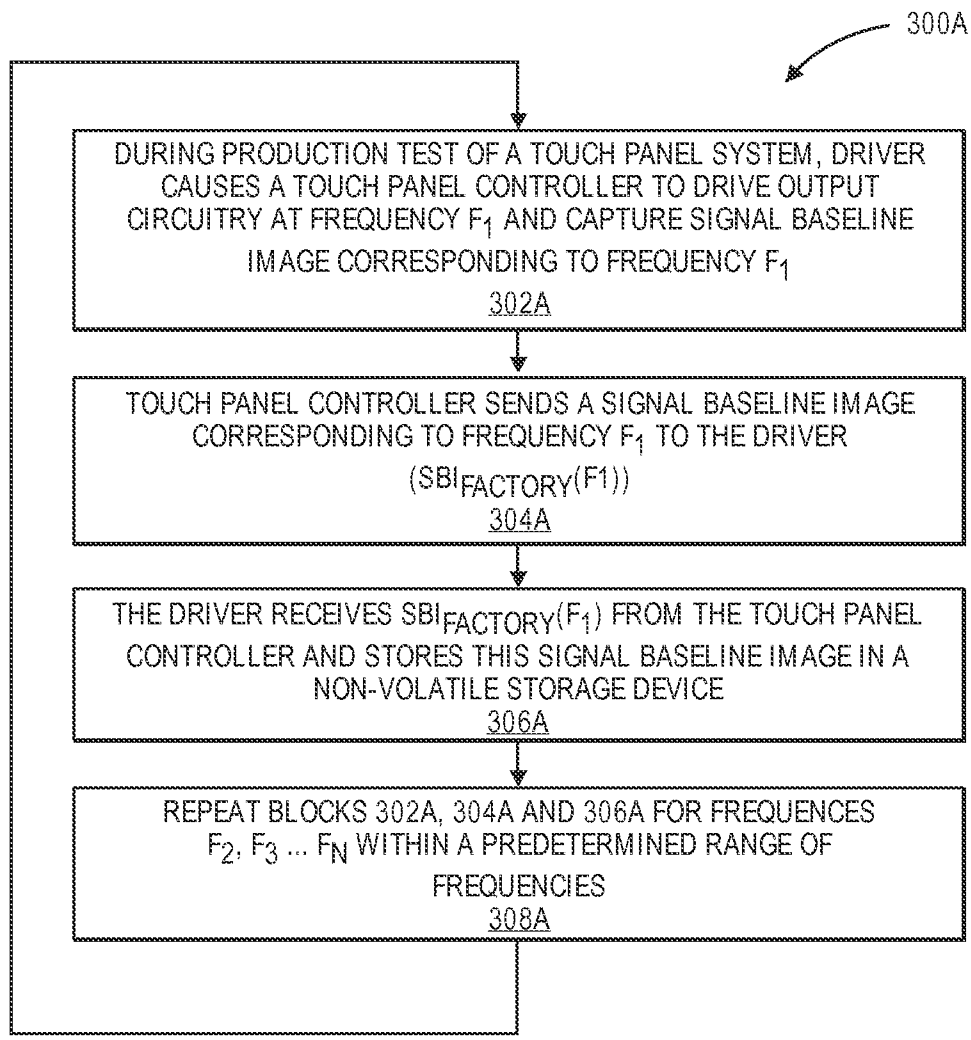
FIG. 3A is a flow diagram illustrating an example method for capturing signal baseline images at multiple drive frequencies during a production test and storing the baseline images in a storage device communicatively coupled to a processor, such as a host processor, in accordance with an example implementation of the present disclosure.
Figure 3B:
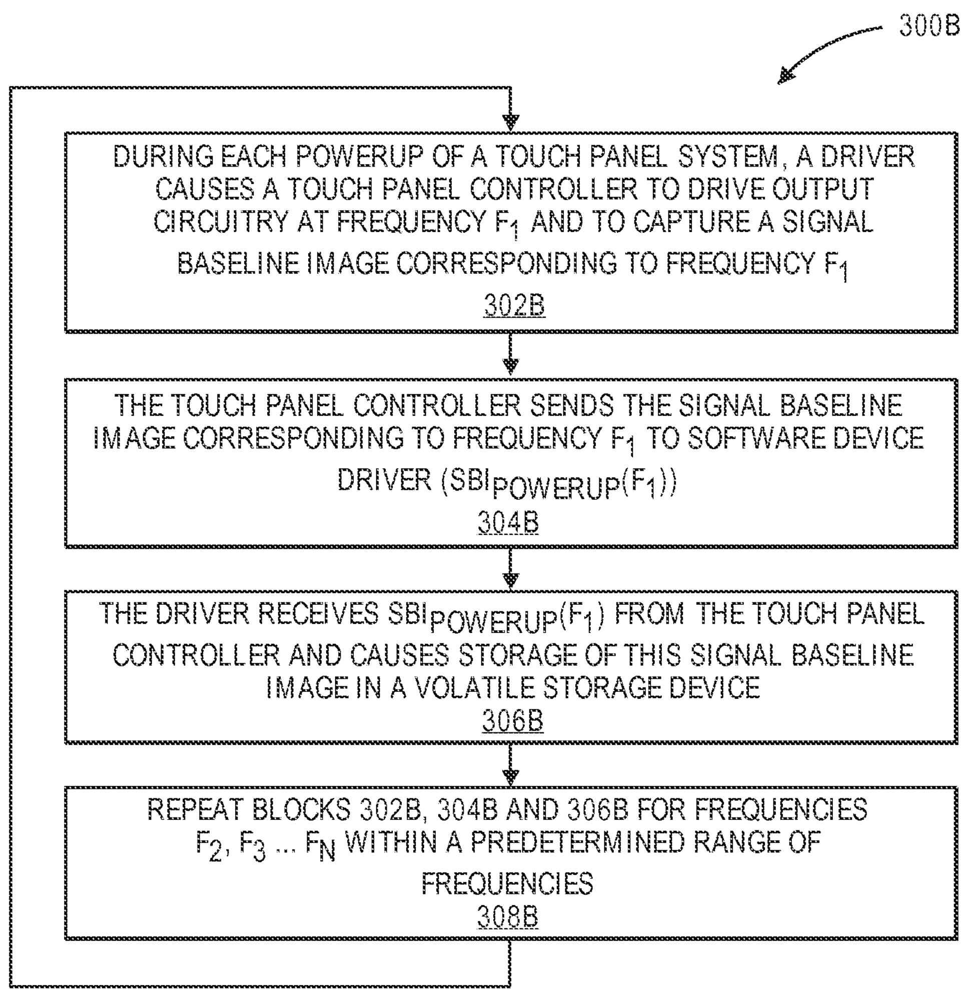
FIG. 3B is a flow diagram illustrating an example method for capturing signal baseline images at multiple drive frequencies during power-up of a touch panel system and storing the signal baseline images in a storage device communicatively coupled to a processor, such as a host processor, in accordance with an example implementation of the present disclosure.

FIG. 3A illustrates a method 300A for capturing signal baseline images across a range of frequencies $F_1$, $F_2$, $F_3$. . . $F_N$ during production test and then storing them in a non-volatile storage device (memory) 104A. FIG. 3B illustrates a method 300B for capturing signal baseline images across a range of frequencies $F_1$, $F_2$, $F_3$ . . . $F_N$ during power-up of system 100 and then storing them in a volatile storage device (memory) 104B. As shown in FIG. 3A during production testing of a touch panel system, a driver (e.g., software device driver) residing within a processor (e.g., a host processor) is configured to cause a touch panel controller to drive output circuitry at a first frequency ($F_1$) and capture a signal baseline image corresponding to the first frequency ($F_1$) (Block 302A). As shown in FIG. 3B, during each power-up (e.g., boot-up) of the touch panel system, a driver residing within a processor causes a touch panel controller to drive output circuitry at frequency ($F_1$) and capture signal baseline images corresponding to the frequency ($F_1$)(Block 302B). As described above, the software device driver 120 is configured to cause the controller 106 to measure a baseline image within a predefined range of frequencies. For example, the controller 106 measures signal baseline images across a range of frequencies during a system-level production test and measures baseline images across the range of frequencies upon startup of the system 100 (e.g., when a device incorporating the system 100 is initialized). In an implementation the controller 106 causes generation of drive signals at a first frequency ($F_1$) and, in response, the controller 106 measures the capacitive values (e.g., baseline image) at the intersections 118 within the sensor 108 (e.g., measure the capacitive values based upon the drive signal occurring at the first frequency). As described above, a baseline image comprises a plurality of capacitive values that correspond to individual intersections 118 at a specific frequency.

As shown in FIG. 3A the touch panel controller sends (e.g., transmits) the signal baseline image corresponding to the first frequency ($F_1$) to the driver ($SBI_{FACTORY}(F_1)$)(Block 304A). As shown in FIG. 3B, the touch panel controller is configured to send (e.g., transmit) signal baseline images corresponding to the frequency ($F_1$) to the driver (e.g., software device driver) (Block 304B). When controller 106 captures the signal baseline image at first drive frequency ($F_1$), it sends the signal baseline image to the software device driver 120 over the communication interface (e.g., bus) 124. The software device driver 120 then causes the controller 106 to generate a drive signal at a second frequency ($F_2$) and in response, the controller 106 measures the capacitive values of the intersections 118 within the sensor 108. The controller 106 then sends (e.g., transmits) this signal baseline image at second drive frequency ($F_2$) to the software device driver 120. The software device driver 120 causes the controller 106 to perform the signal baseline image capture across the remaining frequencies ($F_3$, $F_4$ . . . $F_N$) within the range of frequencies. As shown in FIG. 3A, the driver receives a signal baseline image $SBI_{FACTORY}(F_1)$ from the touch panel controller, and driver causes storage the baseline image $SBI_{FACTORY}(F_1)$ in a storage device (e.g., a non-volatile storage device)(Block 306A). As shown in FIG. 3B, the driver receives $SBI_{POWERUP}(F_1)$ from a touch panel controller, and the driver causes storage of the baseline image $SBI_{POWERUP}(F_1)$ into a storage device (e.g., a volatile storage device)(Block 306B). As shown in FIG. 3A, the techniques described within Blocks 302A, 304A, and 306A are repeated for frequencies $F_2$, $F_3$ . . . $F_N$ within the range of frequencies (Block 308A). As shown in FIG. 3B, Blocks 302B, 304B, and 306B are repeated for frequencies $F_2$, $F_3$ . . . $F_N$ within the range of frequencies (Block 308B). After obtaining signal baseline images across the drive frequencies ($F_1$, $F_2$, $F_3$ . . . $F_N$), the software device driver 120 causes storage of the signal baseline image values for the drive frequencies in the storage devices 104A, 104B communicatively connected to the host processor 102.

Figure 4:
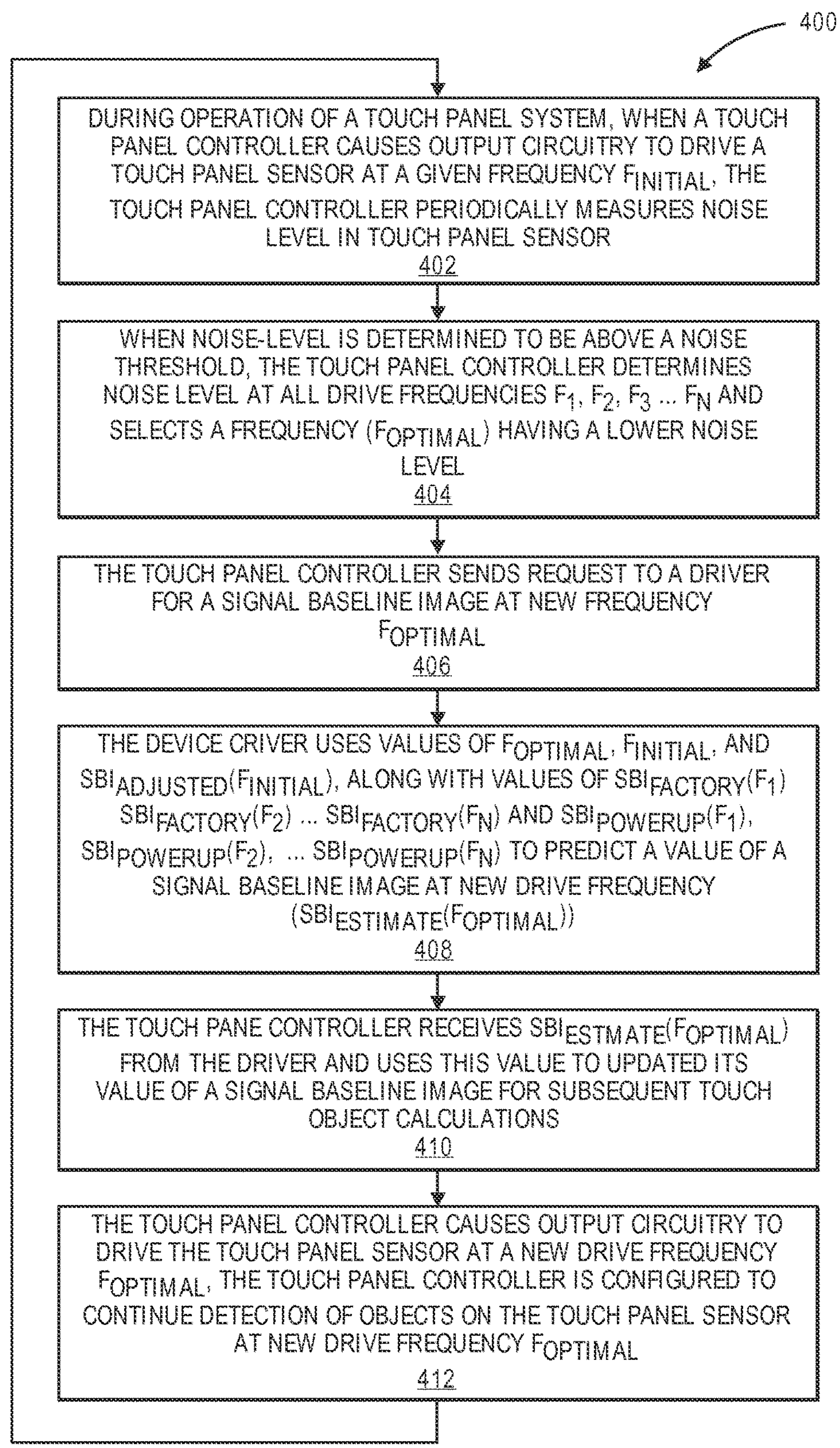
FIG. 4 is a flow diagram illustrating an example method for dynamically switching a touch panel sensor to a lower noise environment in accordance with an example implementation of the present disclosure.

FIG. 4 illustrates a method 400 for dynamically changing a frequency of drive signal and corresponding signal baseline image when a noisy environment is detected. As described above, the frequency of the drive signal may be changed while an object(s) (e.g., finger) is still positioned in proximity of or in contact with the touch panel sensor 108. As shown in FIG. 4, during operation of a touch panel system, when a touch panel controller causes output circuitry to drive a touch panel sensor at a given frequency $F_{INITIAL}$, the touch panel controller periodically measures a noise-level present within the touch panel sensor (Block 402). As discussed above a plurality of baseline images within a predefined frequency range are measured and stored in storage devices 104A, 104B of the host processor 102. The touch controller 106 measures a noise level in the panel 108 periodically. When a noise-level is above a predetermined noise threshold the touch panel controller determines a noise-level at all drive frequencies $F_1$, $F_2$, $F_3$ . . . $F_N$ and selects a frequency ($F_{OPTIMAL}$) having a lower noise-level (Block 404). When noise-level is determined to be above a threshold value, a noise spectrum analysis is performed. That is, a noise-level is measured across drive frequencies $F_3$, $F_4$ . . . $F_N$ within the range of frequencies.

As shown in FIG. 4, the touch panel controller sends (e.g., transmits) a request to a driver (e.g., software device drivers) for a signal baseline image at frequency $F_{OPTIMAL}$ (Block 406). A frequency $F_{OPTIMAL}$ is determined by controller 106 that has a lower noise level than the operating drive frequency ($F_{INITIAL}$). On determining this new frequency, the controller 106 sends (e.g., transmits) a request to the software device driver 120 residing on the host processor 102 to send the controller 106 a new signal baseline image corresponding to the drive frequency $F_{OPTIMAL}$. The controller 106 also sends (e.g., transmits) a value of $F_{OPTIMAL}$, a value of $F_{INITIAL}$, and a signal baseline image being used by controller 106 for touch calculations ($SBI_{ADJUSTED}(F_{INITIAL})$).

The driver utilizes values of $F_{OPTIMAL}$, $F_{INITIAL}$ and $SBI_{ADJUSTED}(F_{INITIAL})$ and pre-stored signal baseline image values $SBI_{FACTORY}(F_1)$, $SBI_{FACTORY}(F_2)$ . . . $SBI_{FACTORY}(F_N)$ and $SBI_{POWERUP}(F_1)$, $SBI_{POWERUP}(F_2)$ . . . $SBI_{POWERUP}(F_N)$ to predict a value of a signal baseline image value ($SBI_{ESTIMATED}(F_{OPTIMAL})$) at a new frequency (Block 408). The software device driver 120 uses the signal baseline values across the frequencies captured during production test ($SBI_{FACTORY}$) and during power-up ($SBI_{POWERUP}$). The driver 120 utilizes these values and values received from controller 106 (e.g., $F_{OPTIMAL}$, $F_{INITIAL}$ and $SBI_{ADJUSTED}(F_{INITIAL})$) to calculate a new prediction of the signal baseline image at the new drive frequency $F_{OPTIMAL}$. This predicted signal baseline image $SBI_{ESTIMATE}(F_{OPTIMAL})$ is sent (e.g., transmitted) to the controller 106 over communication interface (e.g., bus) 124. As shown in FIG. 4, the touch panel controller receives $SBI_{ESTIMATE}(F_{OPTIMAL})$ and utilizes this value to update the value of the signal baseline image for subsequent touch object calculations (Block 410), and the touch panel controller is configured to cause output (drive) circuitry to drive the touch panel at the new drive frequency $F_{OPTIMAL}$ to detect touch objects over the touch panel sensor at the new drive frequency $F_{OPTIMAL}$ (Block 412). When the controller 106 receives $SBI_{ESTIMATE}(F_{OPTIMAL})$, it changes drive frequency to $F_{OPTIMAL}$ and uses newly received signal baseline image ($SBI_{ESTIMATE}(F_{OPTIMAL})$) to perform future touch object detection.

Conclusion

Although the subject matter has been described in language specific to structural features and/or process operations, it is to be understood that the subject matter defined in the appended claims is not necessarily limited to the specific features or acts described above. Rather the specific features and acts described above are disclosed as example forms of implementing the claims.

What is claimed is:

1. An apparatus comprising:

a touch panel controller configured to operatively couple to a touch panel sensor, the touch panel sensor including a plurality of drive electrodes and at least one sense electrode, a plurality of nodes being formed at intersections of the plurality of drive electrodes and the at least one sense electrode, the touch panel controller comprising:

output circuitry operatively coupled to the plurality of drive electrodes, the output circuitry capable of generating drive signals having a configurable frequency characteristic occurring within a range of frequencies to drive the touch panel sensor; and input circuitry operatively coupled to the at least one sense electrode, the input circuitry capable of measuring capacitance formed at each intersection of the plurality of drive electrodes and of the at least one sense electrode, wherein the apparatus is configured to:

obtain a plurality of signal baseline images during a power-up mode of the apparatus, the plurality of signal baseline images including a plurality of capacitance values measured at the intersections of the plurality of drive electrodes and the at least one sense electrode, each signal baseline image of the plurality of signal baseline images corresponding to a drive frequency;

store the plurality of signal baseline images in a storage device;

cause the output circuitry to generate drive signals at a first frequency;

determine when a first noise level of the touch panel is above a noise threshold while the output circuitry generates drive signals at the first frequency and, when the first noise level is above the noise threshold, determine noise levels at each of a plurality of drive frequencies;

select a second drive frequency that corresponds with a second noise level that is lower than the first noise level;

cause the output circuitry to generate drive signals at the second drive frequency; and calculate a prediction of a signal baseline image corresponding with the second drive frequency, the prediction being based, at least in part, on a signal baseline image selected from the plurality of signal baseline images obtained and stored during the power-up mode of the apparatus.

2. The apparatus as recited in claim 1, further comprising a host processor, wherein the touch panel controller is capable of communicating with the host processor.

3. The apparatus as recited in claim 1, wherein the signal baseline image comprises a plurality of capacitive values measured at a selected drive frequency, each capacitive value corresponding to a node of the plurality of nodes.

4. The apparatus as recited in claim 1, wherein the output circuitry comprises a digital-to-analog converter coupled to a buffer the buffer coupled to at least one drive electrode of the plurality of drive electrodes.

5. The apparatus as recited in claim 1, wherein the input circuitry comprises a charge amplifier, the charge amplifier further comprising an operational amplifier having an inverting input terminal, a non-inverting input terminal and an output terminal, the inverting input terminal coupled to at least one sense electrode; and an integrating capacitor electrically coupled between the inverting input terminal and the output terminal.

6. A system comprising:

a touch panel sensor capable of detecting a change in capacitance associated with an object positioned over the touch panel sensor;

a touch panel controller operatively coupled to the touch panel sensor, the touch panel controller capable of:

obtaining a plurality of signal baseline images during a power-up mode of the system the plurality of signal baseline images including a plurality of capacitance values measured at intersections of a plurality of drive electrodes and at least one sense electrode of the touch panel sensor, each signal baseline image of the plurality of signal baseline images corresponding to a drive frequency;

storing the plurality of signal baseline images in a storage device;

causing the generation of at least one drive signal having a first frequency characteristic occurring within a range of drive frequencies to drive the touch panel sensor;

measuring noise present within the touch panel sensor; and measuring a signal baseline image of the touch panel sensor within the range of drive frequencies;

a host processor operatively coupled to the touch panel controller, the host processor being capable of communicating with the touch panel controller; and at least one storage device that is communicatively coupled to the host processor and capable of storing the signal baseline images wherein the system is capable of:

determining when a first noise level of the touch panel is above a noise threshold while the output circuitry is generating drive signals at the first frequency characteristic and, when the first noise level is above the noise threshold, determining noise levels at each of a plurality of drive frequencies;

selecting a second drive frequency characteristic that corresponds with a second noise level that is lower than the first noise level;

calculating a prediction of a signal baseline image corresponding with the second drive frequency characteristic, the prediction being based, at least in part, on a signal baseline image selected from the plurality of signal baseline images obtained and stored during the power-up mode; and causing the generation of at least one drive signal having the second drive frequency characteristic.

7. The system as recited in claim 6, wherein the baseline image comprises a plurality of capacitive values measured at a selected drive frequency occurring within the range of frequencies, each capacitive value corresponding to a capacitive node within the touch panel sensor.

8. The system as recited in claim 6, wherein touch panel controller includes output circuitry communicatively coupled to the touch panel sensor, the output circuitry capable of generating drive signals having frequency characteristics occurring within the range of frequencies.

9. The system as recited in claim 8, wherein the output circuitry comprises a digital-to-analog converter coupled to a buffer, the buffer coupled to at least one drive electrode of the plurality of drive electrodes.

10. The system as recited in claim 6, wherein the touch panel controller includes input circuitry communicatively coupled to the touch panel sensor, the input circuitry capable of determining when the object performs a touch event over the touch panel sensor.

11. The system as recited in claim 10, wherein the input circuitry comprises a charge amplifier, the charge amplifier further comprising an operational amplifier having an inverting input terminal, a non-inverting input terminal, and an output terminal, the inverting input terminal coupled to at least one sense electrode; and an integrating capacitor electrically coupled between the inverting input terminal and the output terminal.

12. The system as recited in claim 6, wherein the host processor comprises an applications processor.

13. The system as recited in claim 6, wherein the system is controlled, at least in part, by a software module operating integrated to an operating system in the host processor.

14. A method comprising:

obtaining a plurality of signal baseline images during a power-up mode of a touch panel sensor, the plurality of signal baseline images including a plurality of capacitance values measured at the intersections of a plurality of drive electrodes and at least one sense electrode of the touch panel sensor, each signal baseline image of the plurality of signal baseline images corresponding to a drive frequency, each signal baseline image including capacitive values measured within the touch panel sensor at a corresponding drive frequency;

storing the plurality of signal baseline images in a storage device;

generating a drive signal having a first frequency characteristic to drive the touch panel sensor, the touch panel sensor including a plurality of drive electrodes and sense electrodes, a plurality of nodes formed at intersections of the plurality of drive electrodes and the plurality of sense electrodes, each node of the plurality of nodes having a corresponding capacitive value;

detecting noise having a noise level above a noise threshold value, the noise present within the touch panel sensor associated with the drive signal having the first frequency characteristic;

selecting a second frequency within the predefined frequency range having a lower noise level as compared to the noise level associated with the drive signal having the first frequency characteristic; and calculating a prediction of a signal baseline image corresponding with the second drive frequency, the prediction being based, at least in part, on a signal baseline image selected from the plurality of signal baseline images obtained and stored during the power-up mode.

15. The method as recited in claim 14, wherein the calculating occurs during a time when one or more objects are in contact with or in proximity to a touch panel sensor.

16. The apparatus as recited in claim 1, wherein the apparatus is configured to use the prediction of the signal baseline image as a datum for detecting changes in capacitance caused by an object that is positioned in contact with or in proximity to the touch panel sensor.

17. The apparatus as recited in claim 1, wherein the apparatus is configured to calculate the prediction of the signal baseline image while one or more objects are positioned in contact with or in proximity to the touch panel sensor.

18. The system as recited in claim 6, wherein the apparatus is configured to use the prediction of the signal baseline image as a datum for detecting changes in capacitance caused by an object that is positioned in contact with or in proximity to the touch panel sensor.

19. The system as recited in claim 6, wherein the apparatus configured to calculate the prediction of the signal baseline image while one or more objects are positioned in contact with or in proximity to the touch panel sensor.

20. The apparatus as recited in claim 1, wherein the apparatus is configured to:

determine a composite baseline image based on a signal baseline image obtained during the power-up mode of the apparatus and a signal baseline image obtained during a previous time of touch panel calibration; and calculate the prediction of the signal baseline image based, at least in part, on the composite baseline image.

* * * * *